(12) United States Patent
Miyairi et al.

(10) Patent No.: US 11,035,278 B2
(45) Date of Patent: Jun. 15, 2021

(54) HEATER, METHOD OF MANUFACTURING THE SAME, AND SYSTEM

(71) Applicants: NGK INSULATORS, LTD., Nagoya (JP); FAURECIA SYSTEMES D'ECHAPPEMENT, Nanterre (FR)

(72) Inventors: Yukio Miyairi, Nagoya (JP); Masaaki Masuda, Nagoya (JP); Xavier Bartolo, Nanterre (FR)

(73) Assignees: NGK Insulators, Ltd., Nagoya (JP); Faurecia Systemes d'Echappement, Nanterre (FR)

( * ) Notice: Subject to any disclaimer, the term of this patent is extended or adjusted under 35 U.S.C. 154(b) by 0 days.

(21) Appl. No.: 16/659,906

(22) Filed: Oct. 22, 2019

(65) Prior Publication Data

US 2020/0123956 A1 Apr. 23, 2020

(30) Foreign Application Priority Data

Oct. 23, 2018 (JP) .............................. JP2018-199534

(51) Int. Cl.
*F01N 3/28* (2006.01)
*F01N 3/20* (2006.01)

(52) U.S. Cl.
CPC ......... *F01N 3/2828* (2013.01); *F01N 3/2026* (2013.01); *F01N 3/286* (2013.01);
(Continued)

(58) Field of Classification Search
CPC ...... F01N 3/0222; F01N 3/027; F01N 3/0878; F01N 3/2013; F01N 3/2026; F01N 3/28;
(Continued)

(56) References Cited

U.S. PATENT DOCUMENTS

| 5,597,503 A | * | 1/1997 | Anderson | ............. F01N 3/2026 219/552 |
| 5,641,332 A | * | 6/1997 | Faber | .................. B01D 46/005 55/523 |

(Continued)

FOREIGN PATENT DOCUMENTS

| EP | 0 452 125 A2 | 10/1991 |
| EP | 2 375 019 A2 | 10/2011 |

(Continued)

OTHER PUBLICATIONS

Extended European Search Report (Application No. 19204914.6) dated Jan. 14, 2020.

*Primary Examiner* — Jonathan R Matthias
(74) *Attorney, Agent, or Firm* — Burr & Brown, PLLC

(57) ABSTRACT

A heater includes: a conductive ceramic cylinder tube provided with a plurality of cells, each cell being defined by a pair of first cell-walls and a pair of second cell-walls, each first cell-wall extending in a radial direction of the ceramic cylinder tube, and each second cell-wall extending so as to cross the radial direction of the ceramic cylinder tube; an inner electrode electrically coupled to an inner wall of the ceramic cylinder tube; and an outer electrode electrically coupled to an outer wall of the ceramic cylinder tube. Linear portions are radially arranged in the ceramic cylinder tube, each linear portion linearly extending in the radial direction of the ceramic cylinder tube so as to include a plurality of first cell-walls that are arranged on the same axial line that in the radial direction and current flows radially at least via the linear portions between the inner and outer electrodes.

20 Claims, 14 Drawing Sheets

(52) U.S. Cl.
CPC ........ *F01N 3/2013* (2013.01); *F01N 2240/16* (2013.01); *F01N 2330/60* (2013.01)

(58) Field of Classification Search
CPC .. F01N 3/2803; F01N 3/2828; F01N 2240/16; F01N 2330/06; F01N 2330/30; F01N 2330/32; F01N 2330/34; F01N 2330/36; F01N 2330/48; F01N 2470/24
See application file for complete search history.

(56) References Cited

U.S. PATENT DOCUMENTS

| | | | |
|---|---|---|---|
| 2002/0021989 A1* | 2/2002 | Abe | F01N 3/2013 422/174 |
| 2010/0037573 A1* | 2/2010 | Komori | B01D 46/247 55/419 |
| 2011/0250097 A1* | 10/2011 | Ido | C04B 38/0016 422/177 |
| 2012/0131907 A1* | 5/2012 | Yoshioka | F01N 3/323 60/276 |
| 2013/0199991 A1* | 8/2013 | Lescoche | B01D 29/0056 210/484 |
| 2014/0205794 A1* | 7/2014 | Tamai | B01D 46/247 428/116 |
| 2014/0260220 A1* | 9/2014 | Toelle | F01N 13/00 60/324 |
| 2020/0254433 A1* | 8/2020 | Halder | B28B 3/269 |

FOREIGN PATENT DOCUMENTS

| | | |
|---|---|---|
| EP | 2 375 020 A2 | 10/2011 |
| EP | 3 282 105 A1 | 2/2018 |
| JP | S63-067609 U | 5/1988 |
| WO | 2016/163423 A1 | 10/2016 |

* cited by examiner

[Fig. 1]
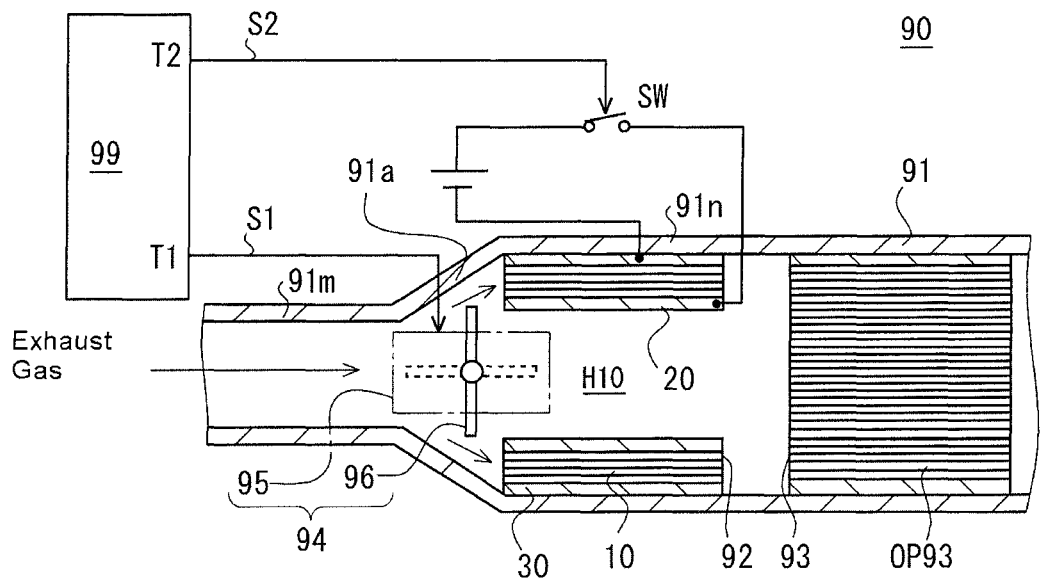
[Fig. 2]
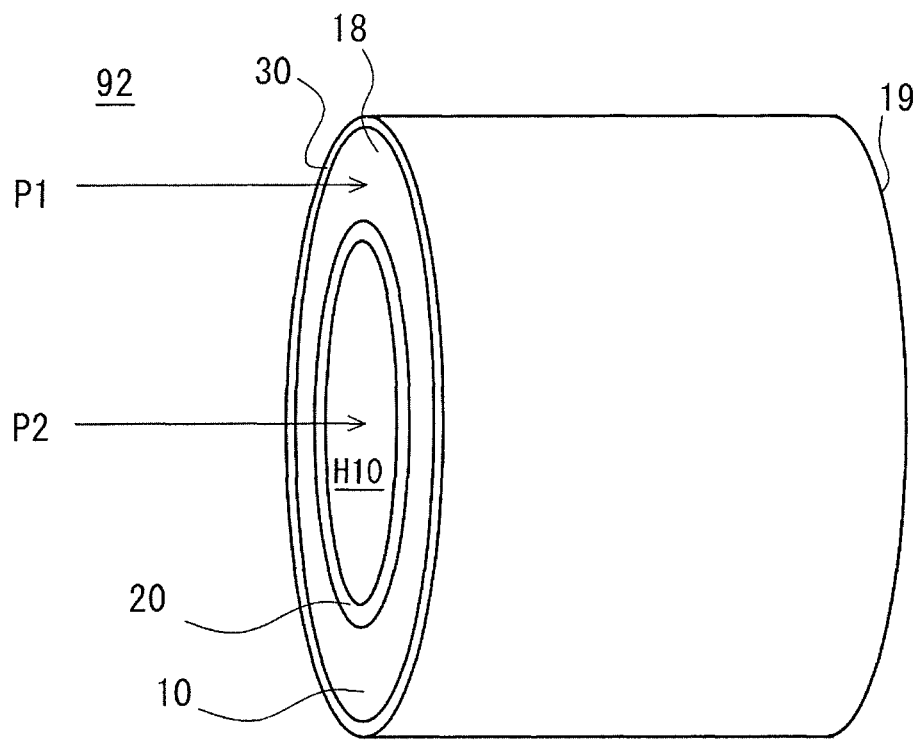

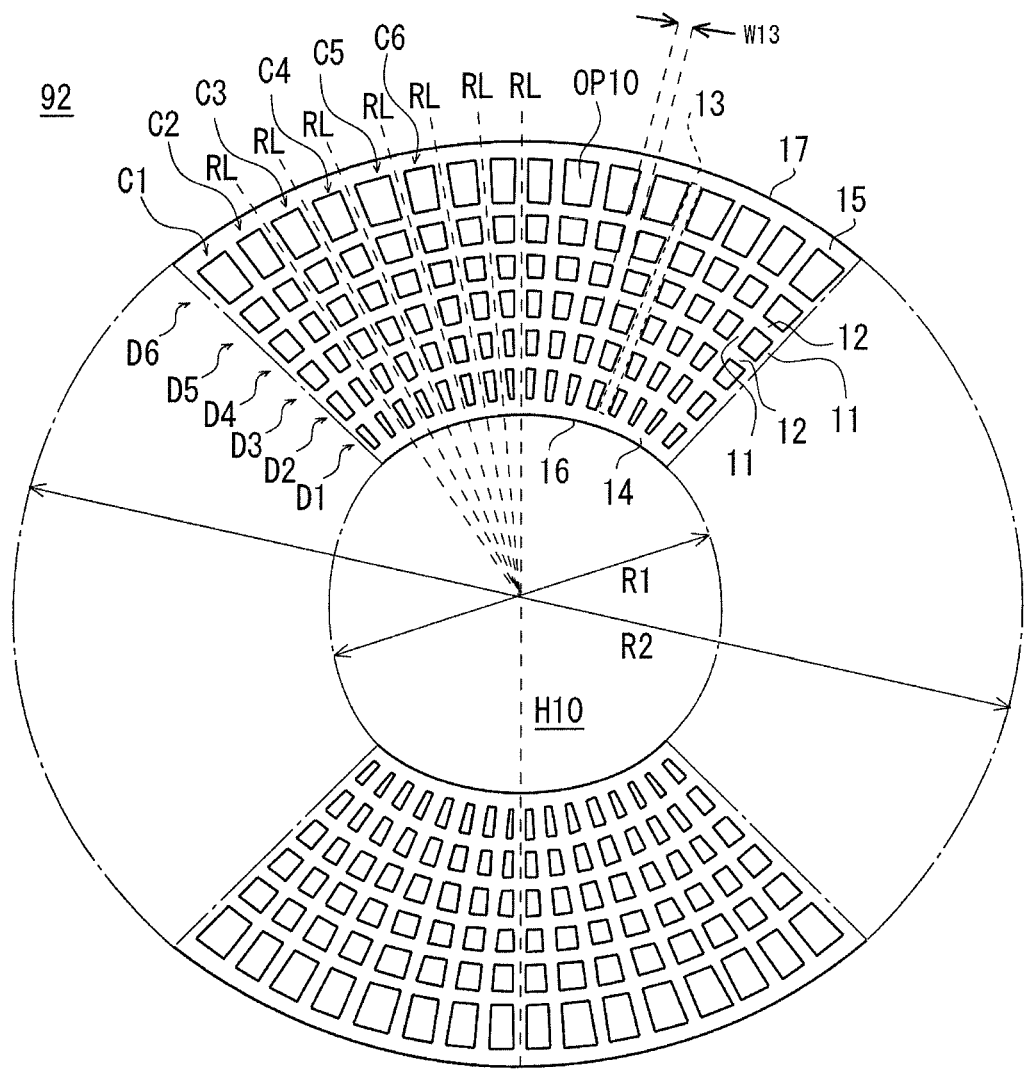
[Fig. 3]

[Fig. 4]
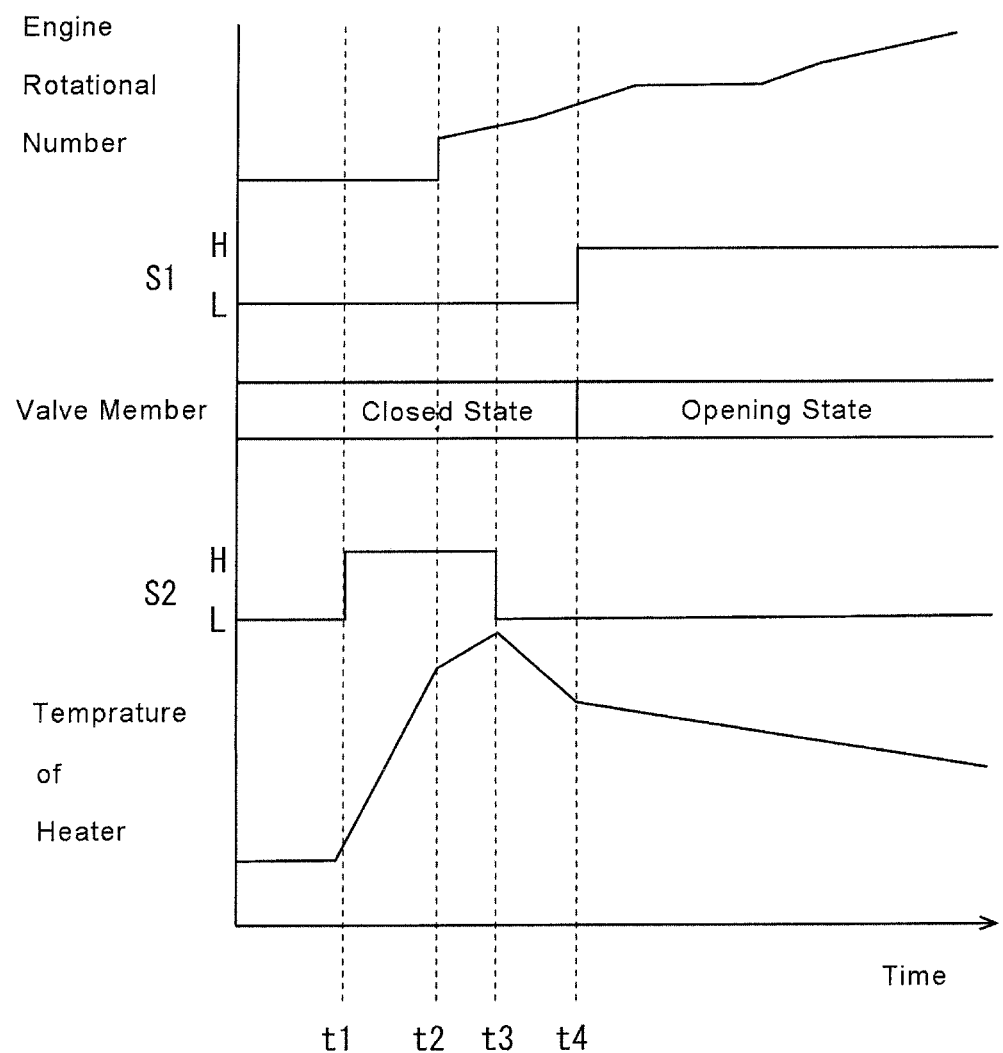

[Fig. 5]
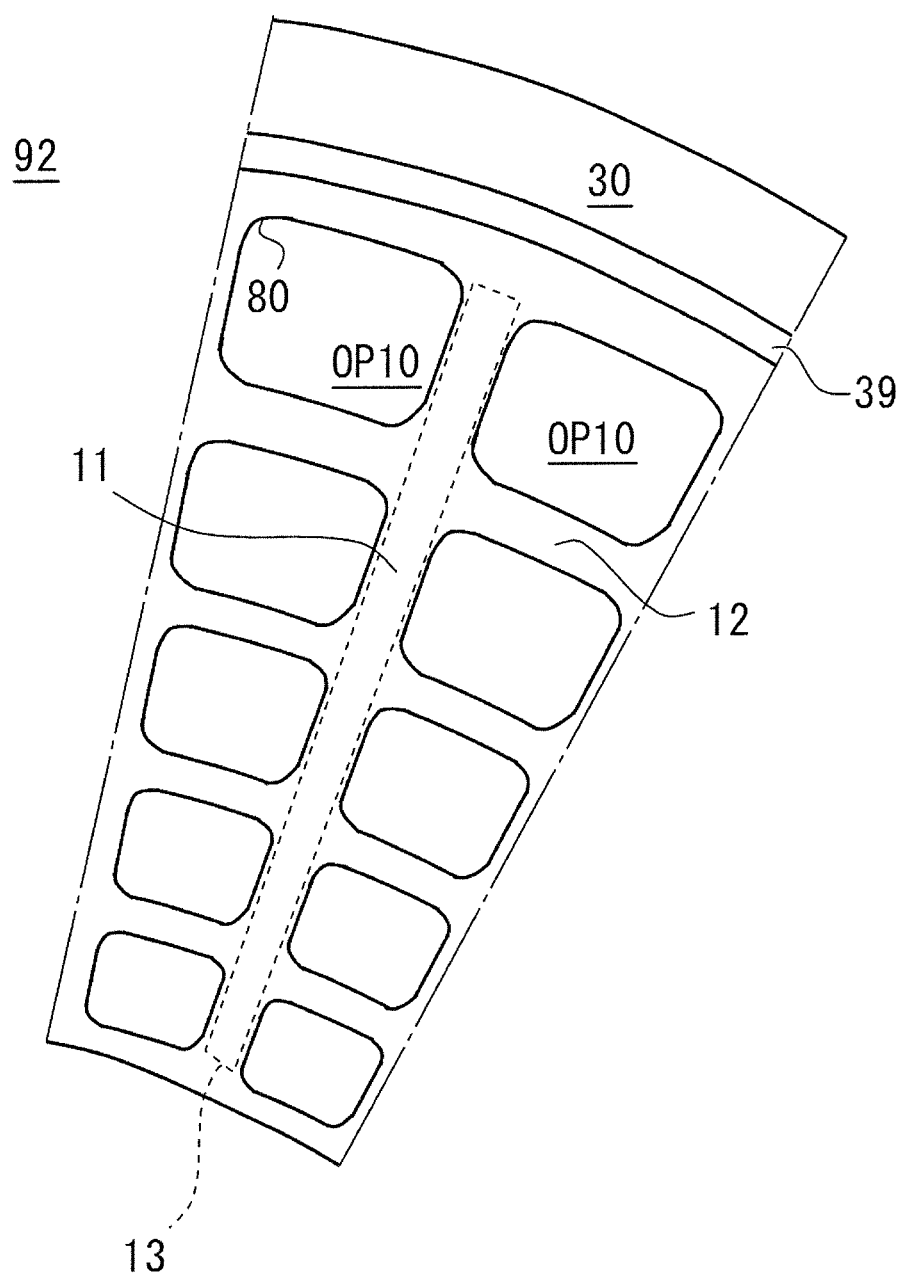

[Fig. 6]
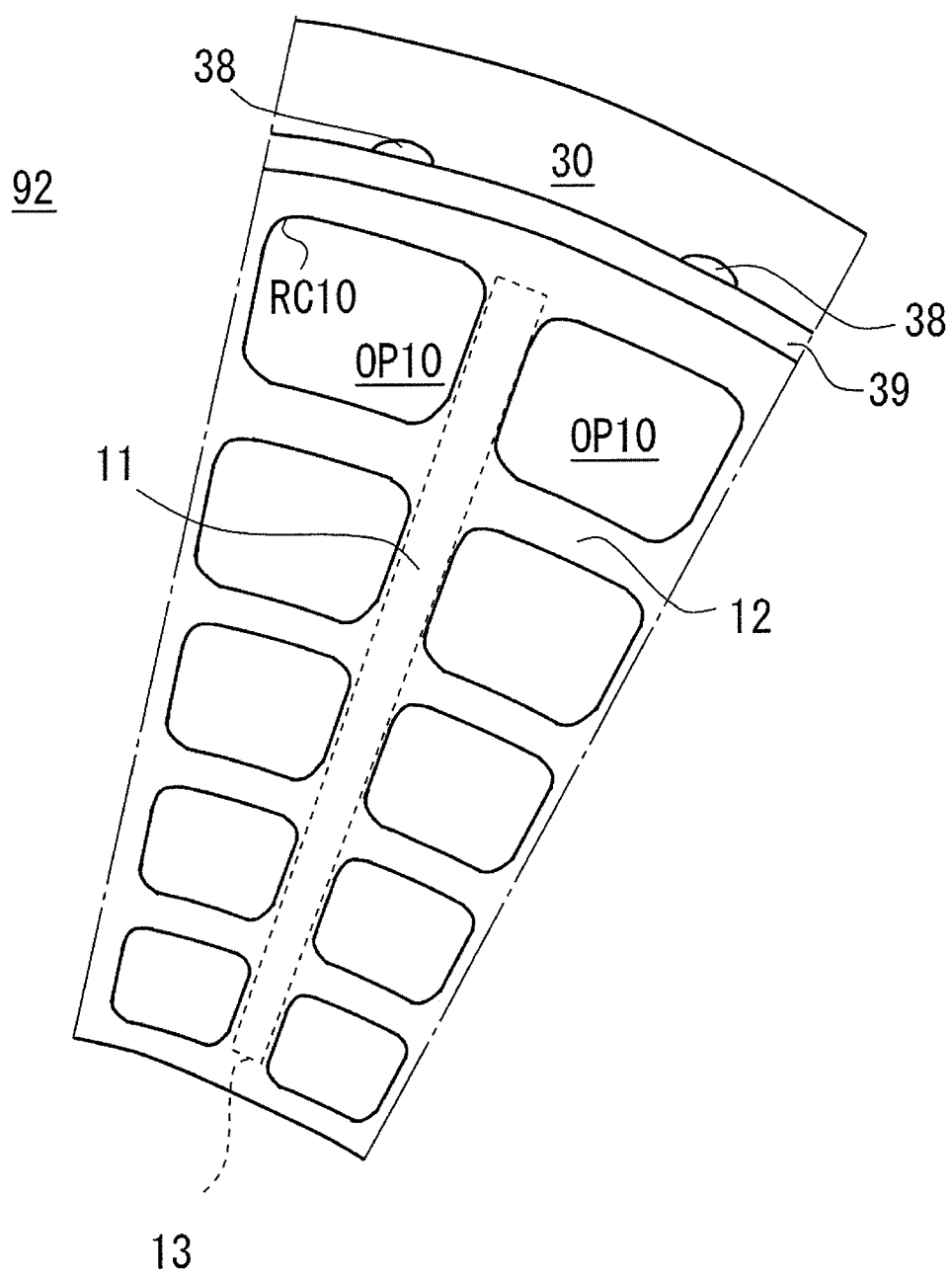

[Fig. 7]
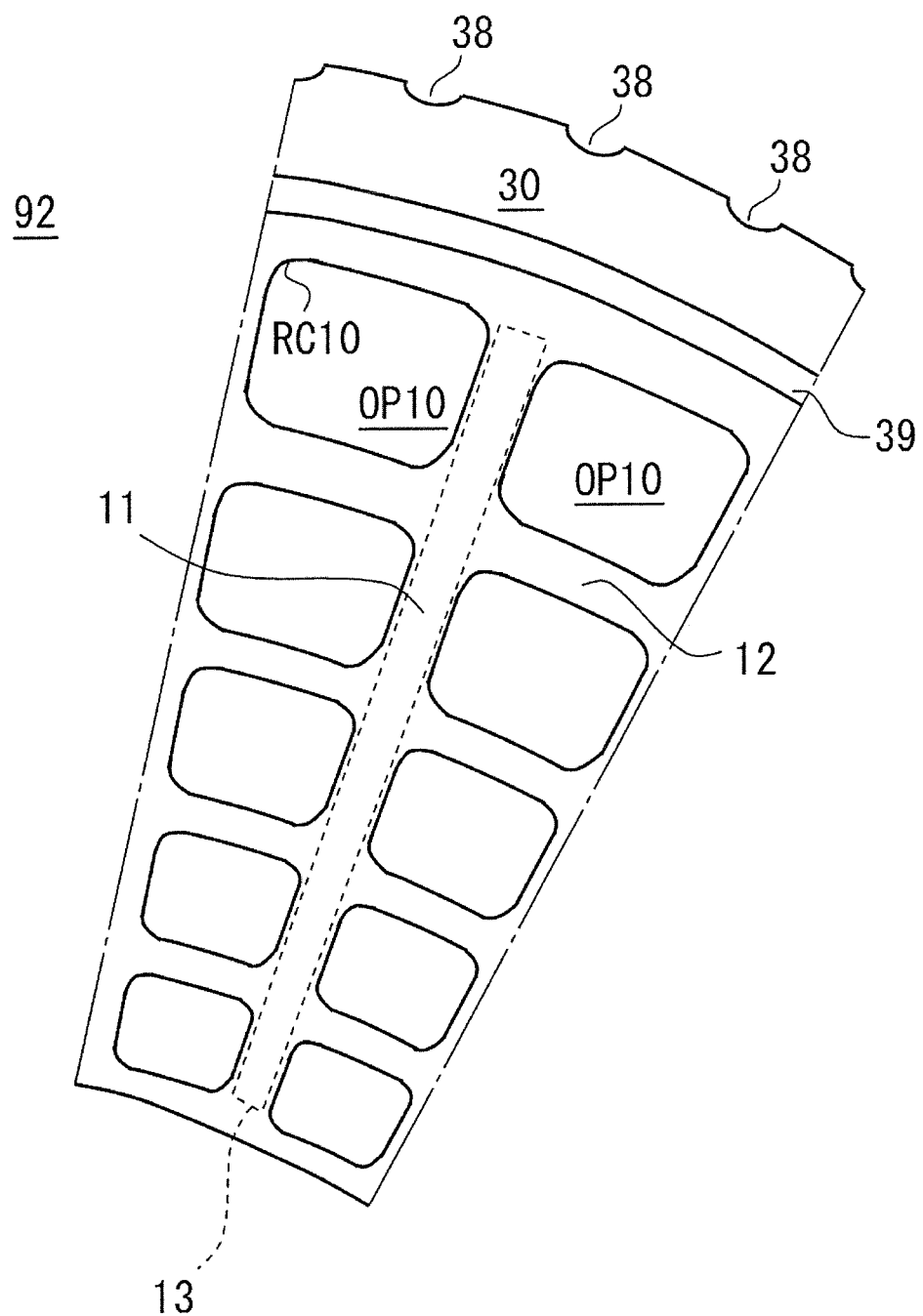

[Fig. 8]
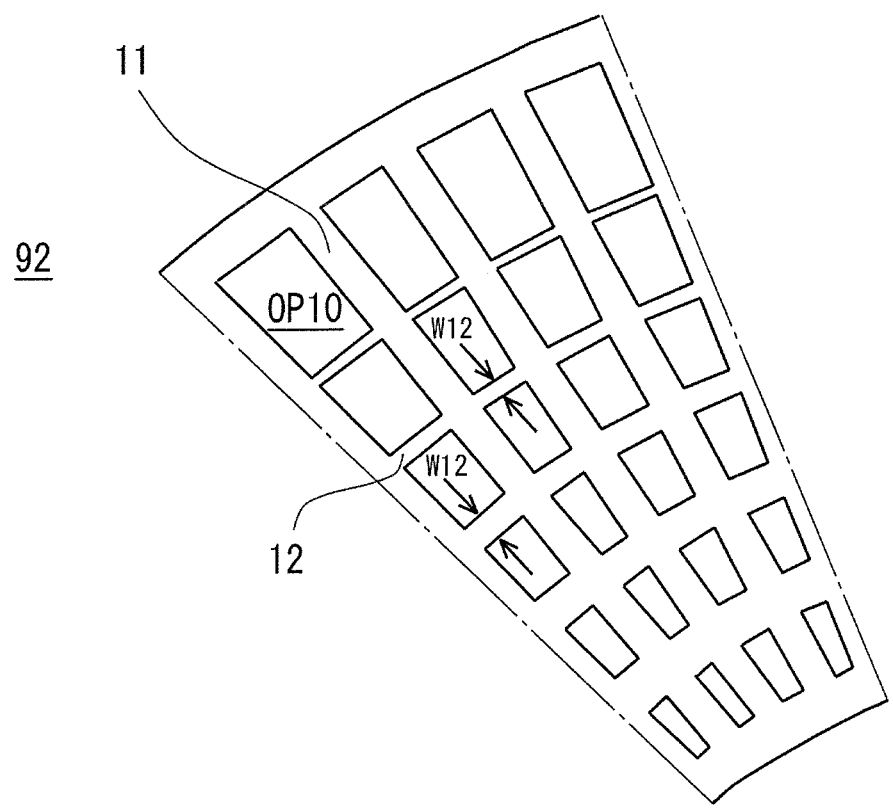

[Fig. 9]
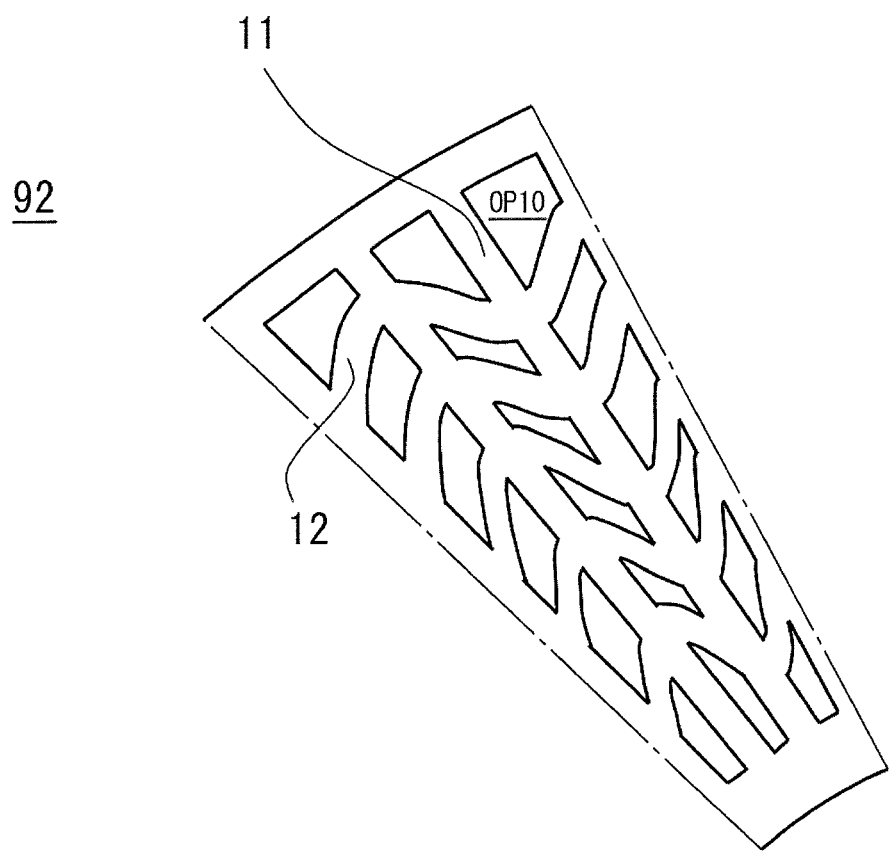

[Fig. 10]
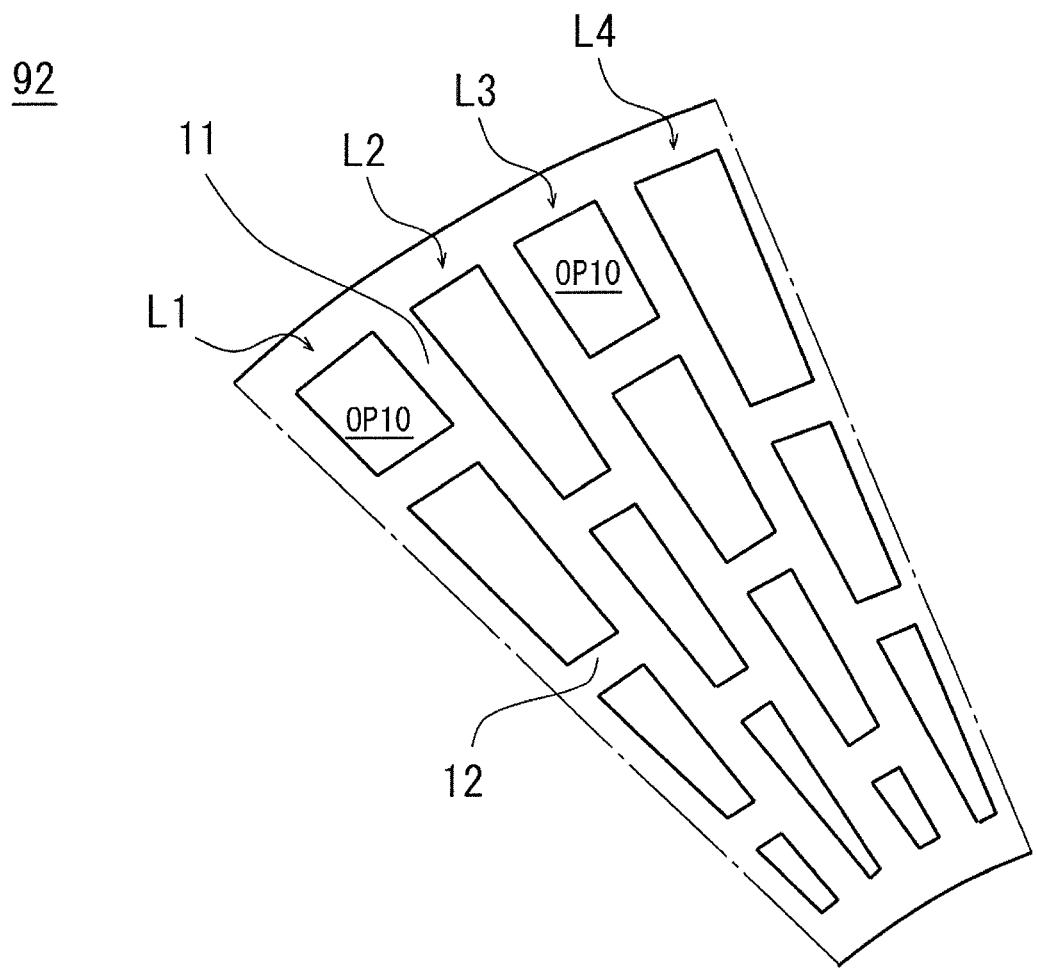

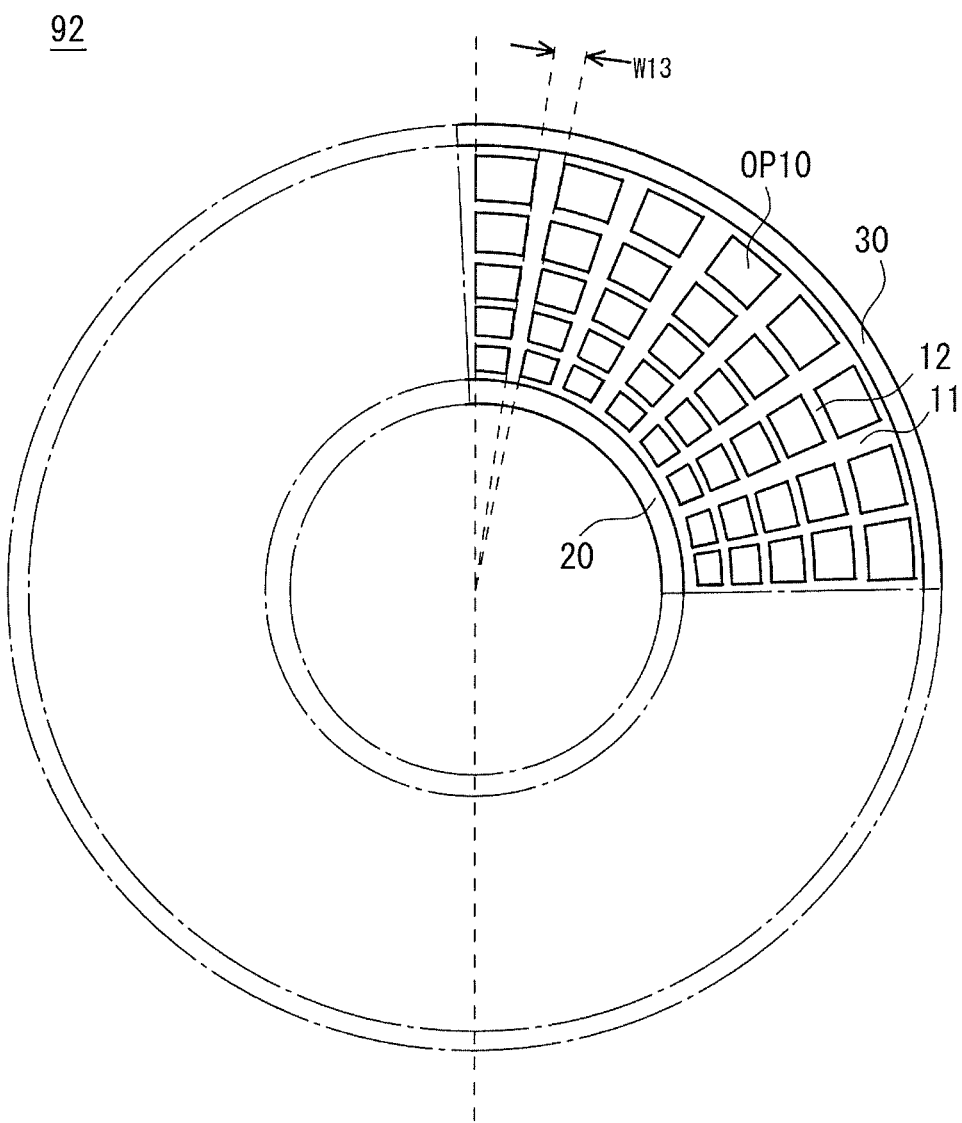
[Fig. 11]

[Fig. 12]
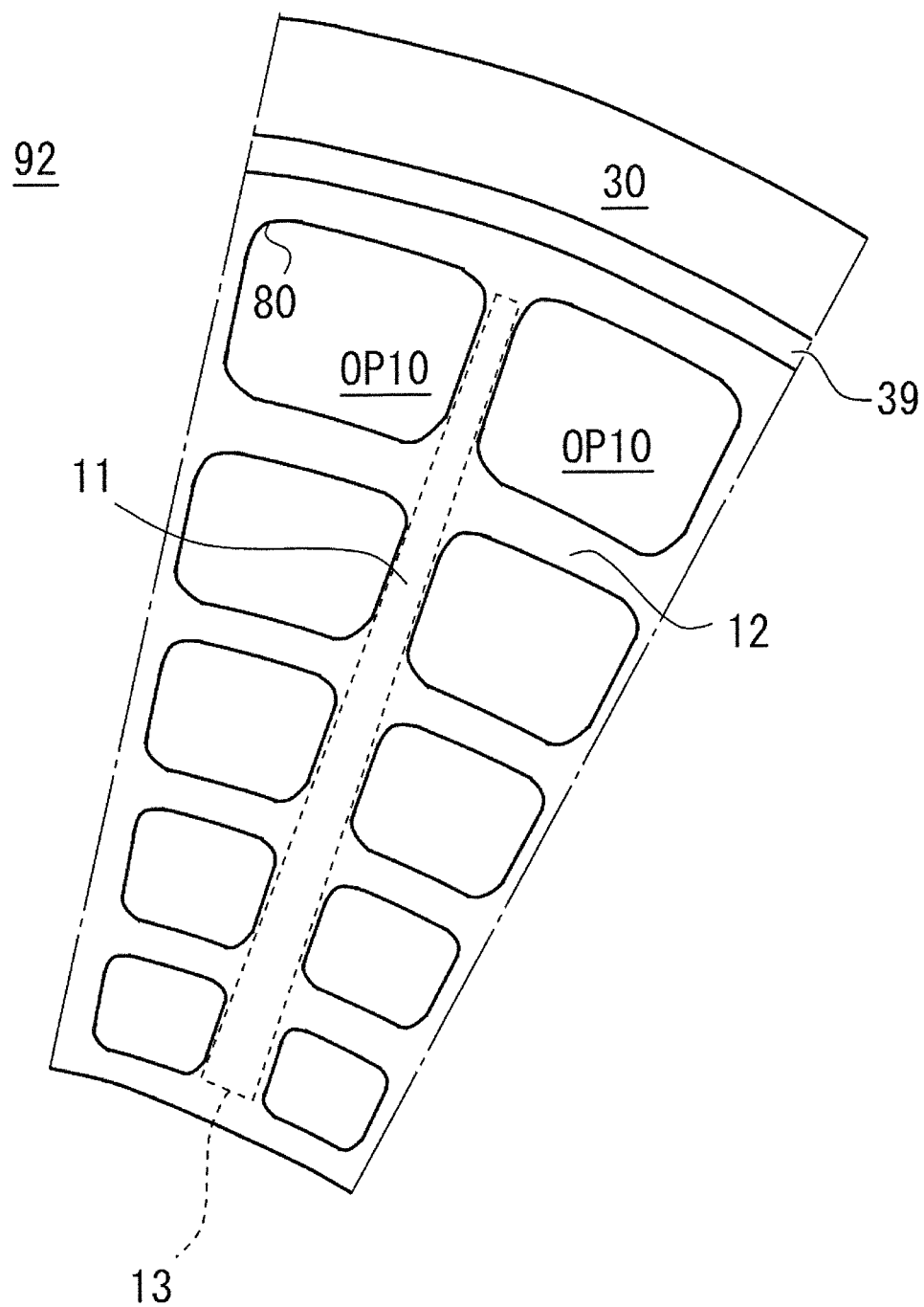

[Fig. 13]
(a)
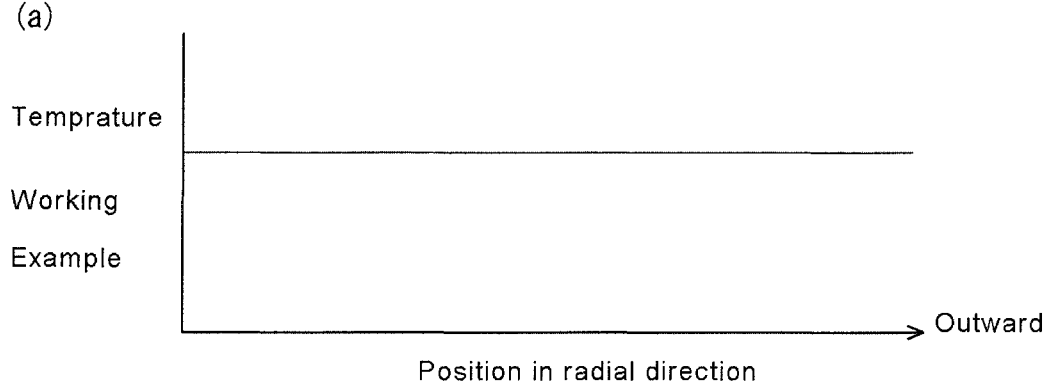
(b)
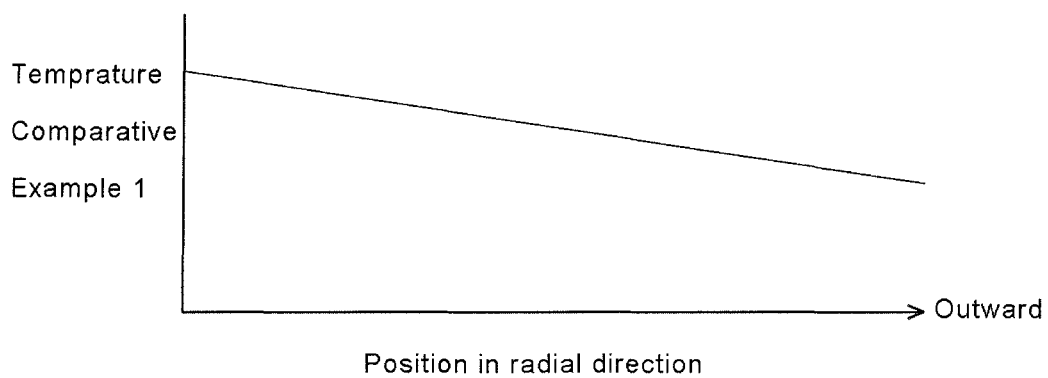

[Fig. 14]
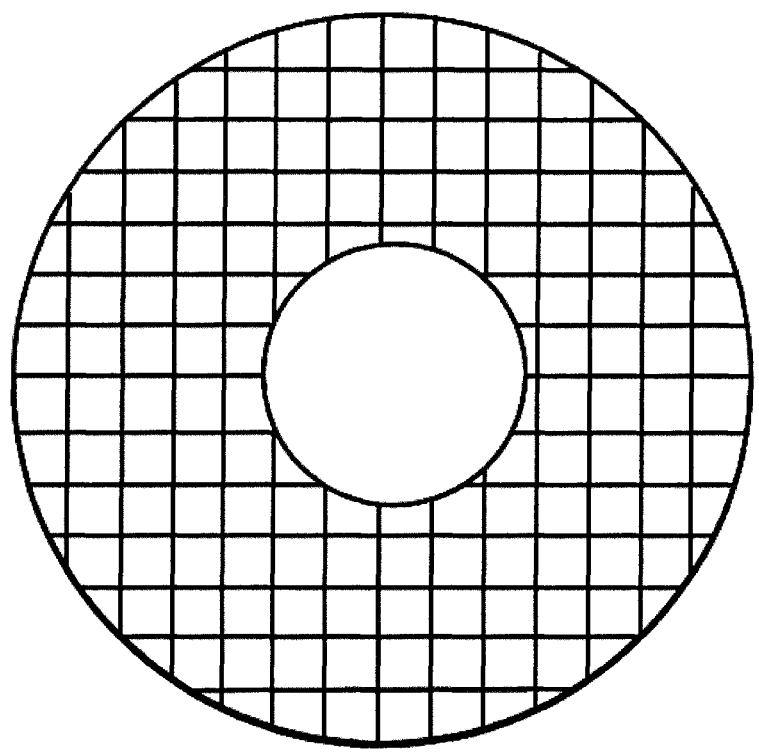

[Fig. 15]
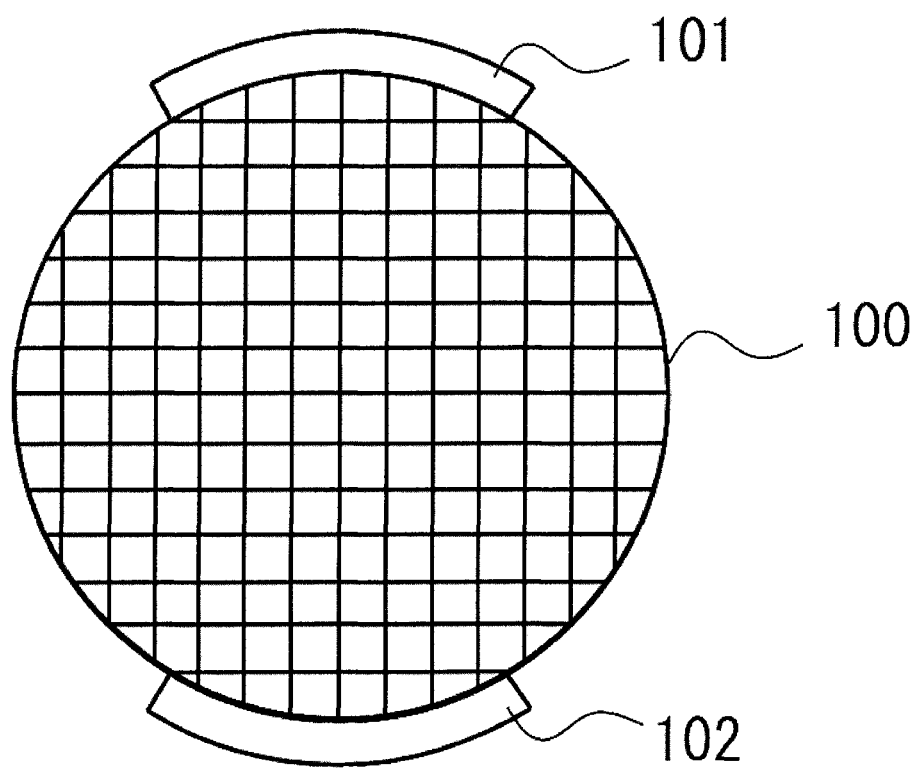

HEATER, METHOD OF MANUFACTURING THE SAME, AND SYSTEM

CROSS-REFERENCE TO RELATED APPLICATION

The present application claims a priority of Japanese Patent Application No. 2018-199534, filed on Oct. 23, 2018 and entitled "HEATER, METHOD OF MANUFACTURING THE SAME, AND SYSTEM", the entire content of which is hereby incorporated by reference.

TECHNICAL FIELD

The present disclosure is related to a heater, a method of manufacturing the same, and system.

BACKGROUND

International publication No. 2016/163423 discloses, as illustrated in its FIG. 1, a device that increases a temperature of a catalyst supported by a ceramic honeycomb structure 20A to its active temperature, by energizing and heating the ceramic honeycomb structure 20A between electrodes 12, 13 (See also para. 0032 of the same literature).

Japanese Utility Model Application Laid-open No. 63-67609 discloses a metal monolith catalyst device disposed upstream of a main monolith catalyst device made of ceramic. In the metal monolith catalyst device, one electrode is provided on its center axis, and an outer frame of the metal monolith catalyst device is used as the other electrode (See FIG. 4 of the same literature). An amount of heat generated in a radially inward portion of the metal monolith catalyst device is greater than an amount of heat generated in a radially outward portion (See FIG. 4 of the same literature). An amount of gas flowing into the radially inward portion of the metal monolith catalyst device is greater than an amount of gas flowing into the radially outward portion of the metal monolith catalyst device. Therefore, a temperature distribution in a traverse plane of the metal monolith catalyst device is equalized (See FIG. 6 of the same literature).

SUMMARY

A heater according to an aspect of the present disclosure may include:
a conductive ceramic cylinder tube provided with a plurality of cells, each cell being defined by a pair of first cell-walls and a pair of second cell-walls, each first cell-wall extending in a radial direction of the ceramic cylinder tube, and each second cell-wall extending so as to cross the radial direction of the ceramic cylinder tube;
an inner electrode electrically coupled to an inner wall of the ceramic cylinder tube; and
an outer electrode electrically coupled to an outer wall of the ceramic cylinder tube, wherein
linear portions are radially arranged in the ceramic cylinder tube, each linear portion linearly extending in the radial direction of the ceramic cylinder tube so as to include a plurality of first cell-walls that are arranged on the same axial line that extends in the radial direction of the ceramic cylinder tube, and
the inner and outer electrodes are provided such that current flows radially at least via said linear portions between the inner and outer electrodes.

In some embodiments, the width of the linear portion may be constant along the radial direction of the ceramic cylinder tube.

In some embodiments, the linear portions may be arranged at a predetermined angular interval in an entire angular range of 360°.

In some embodiments, the predetermined angular interval may be within 1° to 5°.

In some embodiments, the inner electrode and/or the outer electrode may be a tube-like electrode.

In some embodiments, the tube-like electrode may be formed across an entire region of an inner surface of the inner wall of the ceramic cylinder tube or may be formed across an entire region of an outer surface of the outer wall of the ceramic cylinder tube.

In some embodiments, the tube-like electrode may be provided with grooves that are arranged along a circumferential direction of the tube-like electrode.

In some embodiments, $0.3<(R1/R2)$ may be satisfied, where R1 represents an inner diameter of the ceramic cylinder tube, and R2 represents an outer diameter of the ceramic cylinder tube.

In some embodiments, $0.6<(R1/R2)$ may be satisfied, where R1 represents an inner diameter of the ceramic cylinder tube, and R2 represents an outer diameter of the ceramic cylinder tube.

In some embodiments, respective thicknesses of the first and second cell-walls may be within a range of 0.05 to 0.5 mm.

In some embodiments, a thickness of the second cell-wall may be gradually reduced from radially inward side to radially outward side of the ceramic cylinder tube.

In some embodiments, with respect to the second cell-walls which are adjacent in the radial direction of the ceramic cylinder tube, a width of the radially outward second cell-wall of the ceramic cylinder tube may be different from a width of the radially inward second cell-wall of the ceramic cylinder tube.

In some embodiments, a rounded surface may be formed at least one or each corner of the cell.

A system according to an aspect of the present disclosure may include:
a flow passage in which an exhaust gas flows;
any one of above described heater;
an exhaust gas purification device provided downstream of the heater in a flow direction of the exhaust gas in the flow passage; and
a switching unit that switches between first and second flow channels, the first flow channel being provided by the cells of the ceramic cylinder tube included in the heater, and the second flow channel being provided by a tube hole that is surrounded by the cells of the ceramic cylinder tube.

A method of manufacturing a heater according to an aspect of the present disclosure the heater may include:
producing, based on extrusion molding, a conductive ceramic cylinder tube provided with a plurality of cells, each cell being defined by a pair of first cell-walls and a pair of second cell-walls, each first cell-wall extending in a radial direction of the ceramic cylinder tube, and each second cell-wall extending so as to cross the radial direction of the ceramic cylinder tube;
fixing an inner electrode to the ceramic cylinder tube; and
fixing an outer electrode to the ceramic cylinder tube, wherein
linear portions are radially arranged in the ceramic cylinder tube, each linear portion linearly extending in the radial direction of the ceramic cylinder tube so as to include a plurality of first cell-walls that are arranged on the same axial line that extends in the radial direction of the ceramic cylinder tube, and the inner and outer electrodes are provided such that current flows radially at least via said linear portions between the inner and outer electrodes.

In some embodiments, said fixing an inner electrode to the ceramic cylinder tube may include cooling or pressing the inner electrode to be fitted into the ceramic cylinder tube.

In some embodiments, said fixing an outer electrode to the ceramic cylinder tube may include heating the outer electrode to be fitted to the ceramic cylinder tube.

In some embodiments, an intermediate layer may be interposed between the ceramic cylinder tube and the inner electrode.

In some embodiments, an intermediate layer may be interposed between the ceramic cylinder tube and the outer electrode.

According to an aspect of the present disclosure, it may be possible to provide a heater that is capable of increasing its temperature up to a target temperature in short period of time while suppressing that greater temperature gradient is caused at the start of energizing.

BRIEF DESCRIPTION OF DRAWINGS

FIG. 1 is a schematic view of a system according to an aspect of the present disclosure. FIG. 1 is a schematic view of a system capable of supplying exhaust gas to an exhaust gas purification apparatus via cells or tube hole of ceramic cylinder tube based on control of a valve member provided in a flow passage of exhaust gas.

FIG. 2 is a schematic perspective view of a heater that is provided upstream of an exhaust gas purification apparatus in a flow passage of exhaust gas according to an aspect of the present disclosure.

FIG. 3 is a schematic elevational view of a first end of a ceramic cylinder tube included in a heater according to an aspect of the present disclosure. In FIG. 3, inner diameter and outer diameter of the ceramic cylinder tube are indicated by arrows. In FIG. 3, illustration of cells in a region identified by a chain line is omitted.

FIG. 4 is a schematic timing chart showing operation of system according to an aspect of the present disclosure.

FIG. 5 is a schematic view illustrating an embodiment in which an intermediate layer is interposed between an outer electrode and a ceramic cylinder tube and curved surfaces are formed at corners of cells.

FIG. 6 is a schematic view illustrating an embodiment in which grooves extending along an axial direction of a ceramic cylinder tube are formed at an inner circumferential surface of an outer electrode.

FIG. 7 is a schematic view illustrating an embodiment in which grooves extending along an axial direction of a ceramic cylinder tube are formed at an outer circumferential surface of an outer electrode.

FIG. 8 is a schematic view illustrating an embodiment in which width of second cell-wall is gradually decreased from radially inward side to radially outward side of a ceramic cylinder tube.

FIG. 9 is a schematic view illustrating an embodiment in which opening shapes of cells are distorted rectangle.

FIG. 10 is a schematic view illustrating an embodiment in which cell-columns of M cells and cell-columns of N cells are alternately arranged in the circumferential direction.

FIG. 11 is a schematic view illustrating an embodiment in which a width of linear portion linearly extending in radial direction of a ceramic cylinder tube so as to include a plurality of first cell walls arranged on the same axial line extending in a radial direction of a ceramic cylinder tube is gradually increased from radially inward side to radially outward side.

FIG. 12 is a schematic view illustrating an embodiment in which a width of linear portion linearly extending in radial direction of a ceramic cylinder tube so as to include a plurality of first cell walls arranged on the same axial line extending in a radial direction of a ceramic cylinder tube is gradually decreased from radially inward side to radially outward side.

FIG. 13 is a schematic graph showing that in a case of working example, compared to a comparative example, temperature gradient is suppressed in radial direction of a ceramic cylinder tube.

FIG. 14 is a schematic view of ceramic cylinder tube used in a comparative example 1.

FIG. 15 is a schematic view of a heater used in a comparative example 2.

DETAILED DESCRIPTION

Hereinafter, non-limiting exemplary embodiments of the present invention will be described with references to FIGS. 1 to 15. Hereinafter, respective features described for a heater would be understood as individual features independent to other features, additionally to be understood as a combination with other features. Describing all of the combination of individual features would be redundant for a skilled person, and thus omitted. The individual features would be identified by language of "In some embodiments" or simply of "embodiment". The individual features would be understood as a universal feature that is effective not only to a heater disclosed in the drawings for example, but also effective to other various heaters.

FIG. 1 is a schematic view of a system 90 capable of supplying exhaust gas to an exhaust gas purification apparatus 93 via cells OP10 or tube hole H10 of ceramic cylinder tube 10 based on control of a valve member 96 provided in a flow passage 91 of exhaust gas. FIG. 2 is a schematic perspective view of a heater 92 which is provided upstream of an exhaust gas purification apparatus 93 in a flow passage 91 of exhaust gas. FIG. 3 is a schematic elevational view of a first end 18 of a ceramic cylinder tube 10 included in a heater 92. In FIG. 3, inner diameter R1 and outer diameter R2 of the ceramic cylinder tube 10 are indicated by arrows. In FIG. 3, illustration of cells OP10 in a region identified by a chain line is omitted. FIG. 4 is a schematic timing chart showing operation of system 90.

A system 90 may have a flow passage 91 in which exhaust gas flows, a heater 92 provided in the flow passage 91, and an exhaust gas purification apparatus 93 provided in the flow passage 91. The flow passage 91 may be a metal tube for example, and has a first tube 91m having a first inner diameter, a second tube 91n having a second inner diameter, and further a radially-expanded portion 91a between the first tube 91m and the second tube 91n. In the radially-expanded portion 91a, the inner diameter is gradually increased from the first tube 91m toward the second tube 91n. The heater 92 is provided downstream of the radially-expanded portion 91a in the flow direction of exhaust gas in the flow passage 91. The exhaust gas purification apparatus 93 is provided downstream of the heater 92 in the flow direction of exhaust gas in the flow passage 91.

The system 90 further has a switching unit 94 and a controller 99. As would be well understood from the following descriptions, the switching unit 94 performs switching of flow passage of exhaust gas between a first flow passage P1 provided by cells OP10 of ceramic cylinder tube 10 included in the heater 92 and a second flow passage P2 provided by the tube hole H10 surrounded by cells OP10 of the ceramic cylinder tube 10. The switching unit 94 has a driver 95 and a valve member 96 driven by the driver 95. The valve member 96 may be provided in the flow passage 91, in particular provided adjacent to and upstream of the heater 92 in the flow direction of exhaust gas in the flow passage 91. The valve member 96 may be capable of taking a closed state in which the tube hole H10 of the ceramic cylinder tube 10 included in the heater 92 is closed and an opening state in which the tube hole H10 of the ceramic cylinder tube 10 is not closed. In some embodiments, the driver 95 may be a stepper motor, and the valve member 96 is a flat plate fixed to a motor axis of the motor. Any kind of shutter can be used for the switching unit 94. In other embodiments, the driver 95 may be driven by air pressure. ON/OFF of air-pressure-based valve allows opening and closing of a shutter e.g. butterfly valve. Preferably, used would be a shutter capable of opening and closing within a time period equal to or less than 1 second.

The controller 99 is capable of controlling an operational state of the switching unit 94. The controller 99 may transmit a control signal S1 to the driver 95 so as to control the state of the valve member 96 between the opening and closed states. The switching unit 94 may operate in accordance with the control signal S1 received from the controller 99. In an instance where the driver 95 of the switching unit 94 is a stepper motor, the motor axis rotates in accordance with a series of pulse signals of the control signal S1. When the rotational axis of motor rotates by 180 degree in response to the control signal S1, the state of the valve member 96 is switched between the closed and opening states. Note that, an embodiment is envisaged in which a position of valve member 96 is feedback-controlled by detecting a position of the valve member 96.

The exhaust gas flowing in the flow passage 91 may be blocked by the valve member 96 in the closed state from flowing into the second flow passage P2 i.e. the tube hole H10 of the ceramic cylinder tube 10. Under this state, the exhaust gas may flow into the first flow passage P1 of the ceramic cylinder tube 10, i.e. the cells OP10 of the ceramic cylinder tube 10. The exhaust gas which has flowed out of the first flow passage P1 (cells OP10) would flow into the exhaust gas purification apparatus 93 provided downstream of the heater 92.

Switching of the valve member 96 from the closed state to the opening state would result in shifting of the exhaust gas from flowing into the first flow passage P1 (cells OP10) to flowing into the second flow passage P2 (tube hole H10). The exhaust gas which has flowed out of the second flow passage P2 (tube hole H10) of the ceramic cylinder tube 10 would flow into the exhaust gas purification apparatus 93 provided downstream of the heater 92.

The exhaust gas would flow through the first flow passage P1 (cells OP10) when the valve member 96 is closed. The exhaust gas would flow through the second flow passage P2 (tube hole H10) when the valve member 96 is opened. Note that, it is envisaged that a part of exhaust gas may also flow through the second flow passage P2 (tube hole H10) when the valve member 96 is closed, and a part of exhaust gas may also flow through the first flow passage P1 (cells OP10) when the valve member 96 is opened. It is also envisioned that, when the valve member 96 shifts between the closed and opening states, the exhaust gas flows into both of the first flow passage P1 and the second flow passage P2.

The controller 99 may be capable of controlling energization state of the heater 92, additionally to the control of the valve member 96. The controller 99 may transmit a control signal S2 to a switch SW so as to control the energization state of the heater 92 between ON-state and OFF-state. Note that, the controller 99 could possibly be configured by an analog circuit, digital circuit, analog-digital mixed circuit, microcomputer and any combination thereof. An embodiment is envisaged where separate controllers are used for controlling the energization of the heater 92 and for controlling the state of the valve member 96. The control signals S1, S2 may be a pulse signal, for example.

The heater 92 is provided upstream of the exhaust gas purification apparatus 93 in the flow direction of exhaust gas in the flow passage 91 so that the temperature of exhaust gas having reached the heater 92 (which is low) at a time of start of engine can be increased before being supplied to the exhaust gas purification apparatus 93. As a result, purification of exhaust gas in the exhaust gas purification apparatus 93 would be facilitated to be adequate. On the other hand, after a predetermined time period has been passed from a time of start of engine, the exhaust gas reaching the heater 92 would be high enough, and thus necessity of increasing the temperature of exhaust gas would be lowered. After the predetermined time period has passed from a time of start of engine, the valve member 96 may be controlled to take the opening state in which the tube hole H10 of the ceramic cylinder tube 10 is not closed, and the exhaust gas is supplied to the exhaust gas purification apparatus 93 via the tube hole H10 of the ceramic cylinder tube 10. Ability of purification of exhaust gas and suppression of back-pressure would be balanced.

Note that, the exhaust gas purification apparatus 93 may be a ceramic catalyst substrate that supports a catalyst, for example. Through a chemical reaction via the catalyst in the exhaust gas purification apparatus 93, carbon monoxide (CO), nitrogen oxide (NOx), hydrocarbon (HC) in the exhaust gas would be converted to carbon dioxide ($CO_2$), nitrogen ($N_2$), and water ($H_2O$). The catalyst substrate included in the exhaust gas purification apparatus 93 may be a column-like article in which cells OP93 (See FIG. 1) extending in the flow direction of exhaust gas are two-dimensionally arranged, and this may be referred to as a honeycomb structure. The catalyst substrate may include ceramic material such as cordierite ($2MgO.2Al_2O_3.5SiO_2$) or SiC, not necessarily limited to through. The catalyst supported by the catalyst substrate may be, for example, a ceria-based catalyst or noble metal based catalyst or the combination thereof. As the noble metal based catalyst, noble metal material such as Platinum (Pt), palladium (Pd), and rhodium (Rh) can be named as an example.

As illustrated in FIGS. 2 and 3, the heater 92 has a conductive ceramic cylinder tube 10, an inner electrode 20 electrically coupled to the inner wall portion 14 of the ceramic cylinder tube 10, and an outer electrode 30 electrically coupled to the outer wall portion 15 of the ceramic cylinder tube 10. It should be noted that the heater 92 is not limited to be used for heating exhaust gas, but the heater 92 could possibly be used for purifying exhaust gas. That is, an embodiment is envisaged in which first cell-walls 11 or second cell-walls 12 which define the cell OP10 in the ceramic cylinder tube 10 support a catalyst. If the ability of heater 92 for purifying exhaust gas was high enough, then the exhaust gas purification apparatus 93 could possibly be omitted.

The ceramic cylinder tube 10 may be a porous body made of conductive ceramic material. The conductive ceramic material may be one or more material selected from a group consisting of SiC, Si-bonded SiC, and metallic Si impregnated Si—SiC. In some embodiments, the ceramic cylinder tube 10 may be produced based on extrusion molding. In an embodiment, the ceramic cylinder tube 10 is produced by firing a molded article obtained by extrusion molding of mixed clay of at least SiC powder, metallic Si powder, a dispersion medium (e.g. water) and an organic binder. The inner diameter R1 of the ceramic cylinder tube 10 is in the range of 40 to 350 mm, and the outer diameter R2 of the ceramic cylinder tube 10 is in the range of 50 to 400 mm. The inner electrode 20 and/or the outer electrode 30 may be a metal-made electrode such as copper, aluminum, and stainless steel. The thickness of the inner electrode 20 and/or the outer electrode 30 may be 0.5 to 20 mm.

The ceramic cylinder tube 10 may be a cylinder tube body extending in the axial direction, and has a first end 18 and a second end 19 opposite to the first end 18. The ceramic cylinder tube 10 is provided with the plurality of cells OP10. Each cell OP10 is defined by a pair of first cell-walls 11 extending in a radial direction of the ceramic cylinder tube 10 and a pair of second cell-walls 12 extending so as to cross the radial direction of the ceramic cylinder tube 10. The ceramic cylinder tube 10 is provided with a tube hole H10 that extend in the axial direction of the ceramic cylinder tube 10 and is opened at each of the first end 18 and the second end 19 of the ceramic cylinder tube 10. The tube hole H10 is a space positioned so as to be surrounded by the cells OP10, and is defined by the inner wall portion 14 of the ceramic cylinder tube 10. As described above, the cells OP10 provide the first flow passage P1 for exhaust gas. The tube hole H10 provides the second flow passage P2 for exhaust gas.

The first cell-wall 11 extends linearly along the radial direction of the ceramic cylinder tube 10. The second cell-wall 12 extends linearly or in an arc or in other manners so as to cross the radial direction of the ceramic cylinder tube 10. In some embodiments, each thickness of the first cell-wall 11 and the second cell-wall 12 is within a range of 0.05 to 0.5 mm.

The cells OP10 arranged at the innermost position radially in the ceramic cylinder tube 10 illustrated in FIG. 3 is defined by the pair of first cell-walls 11, the inner wall portion 14, and the second cell-wall 12 of the ceramic cylinder tube 10. The cells OP10 arranged at the outermost position radially in the ceramic cylinder tube 10 is defined by the pair of first cell-walls 11, the outer wall portion 15, and the second cell-wall 12 of the ceramic cylinder tube 10.

In some embodiments, the inner wall portion 14 of the ceramic cylinder tube 10 is a coupled portion of radially-innermost second cell-walls 12 of the ceramic cylinder tube 10 in a circumferential direction of the ceramic cylinder tube 10. Likewise, the outer wall portion 15 of the ceramic cylinder tube 10 is a coupled portion of radially-outermost second cell-walls 12 of the ceramic cylinder tube 10 in a circumferential direction of the ceramic cylinder tube 10. Therefore, the radially-innermost cell OP10 of the ceramic cylinder tube 10 may be defined by the pair of first cell-walls 11 and the pair of second cell-walls 12. The radially-outermost cell OP10 of the ceramic cylinder tube 10 may be defined by the pair of first cell-walls 11 and the pair of second cell-walls 12.

The cell OP10 extends along the axial direction of the ceramic cylinder tube 10, and is opened at both ends of the first end 18 and the second end 19 that is opposite to the first end 18 of the ceramic cylinder tube 10. In other words, the cell OP10 has a first open end at the first end 18 of the ceramic cylinder tube 10 and has a second open end at the second end 19 of the ceramic cylinder tube 10. It should be noted that, when the heater 92 is arranged in the flow passage 91, the cells OP10 extend along the flow direction of exhaust gas in the flow passage 91. Each cell OP10 has a rectangular opening shape, but should not be limited to this.

The ceramic cylinder tube 10 is provided with radially arranged two or more cell-columns C1-C6, in each of which a plurality of cells OP10 are arranged in the radial direction of the ceramic cylinder tube 10. In FIG. 3, C1 to C6 are assigned to the selected 6 number of cell-columns, but the ceramic cylinder tube 10 may be actually provided with 50 or more cell-columns. The number of cells OP10 included in respective cell-columns may be constant in some embodiments, and may be difference in other embodiments.

Also, cell-rows D1-D6 would be defined, in each of which cells OP10 are arranged along the circumferential direction of the ceramic cylinder tube 10. The cell-rows D1-D6 are arranged concentrically around the center axis of the ceramic cylinder tube 10. The number of cell-row should not be limited to 6. In some embodiments, the number of cell-row is equal to or less than 20. In an instance in which the outer diameter R2 of the ceramic cylinder tube 10 is restricted by the inner diameter of the flow passage 91, increase in the number of cell-rows may result in decrease of the inner diameter R1 of the ceramic cylinder tube 10 and, in turn, increase of back-pressure during the normal operating time period after the initial heating time period.

Descriptions will be made for operation of system 90 with reference to FIG. 4. At time t1, the controller 99 outputs a control signal S2 of H level to turn the switch SW ON, and thus energizing of the ceramic cylinder tube 10 starts. Along with the start of energizing of the ceramic cylinder tube 10, the temperature of the ceramic cylinder tube 10 increases. Accordingly, the temperature of exhaust gas flowing through the first flow passage P1 of the ceramic cylinder tube 10, i.e. the cells OP10 can be increased. At time t2, an engine starts to operate. Along with the start of engine, an engine rotational number gradually increases. At the time of start of engine, the temperature of ceramic cylinder tube 10 has been sufficiently high. Therefore, the exhaust gas which has reached the heater 92 from the engine can be heated sufficiently by passing through the first flow passage P1 (cells OP10) of the heater 92. At time t3, the controller 99 switches the control signal S2 from H level to L level. Accordingly, the energizing of the ceramic cylinder tube 10 ends.

At time t4, the controller 99 outputs a control signal S1 of H level to set the valve member 96 into the opening state. The exhaust gas starts to flow into the second flow passage P2 (tube hole H10), alternatively to the first flow passage P1 (Cells OP10) in the heater 92. In particular, the exhaust gas is started to be supplied to the exhaust gas purification apparatus 93 via the tube hole H10 of the ceramic cylinder tube 10. At the time of start of engine, the valve member 96 takes the closed state, and thus back-pressure would be unfavorably increased. However, after a predetermined time period passes from the start of engine, the valve member 96 takes the opening state so that the back-pressure is reduced. The back-pressure is increased at the start of engine in return for increased temperature of exhaust gas, but this is only limited to the time when the engine starts to operate.

In some embodiments, time t3, t4 are timings synchronized to the start of engine. That is, the control signal S2 of L level (i.e. energizing termination instruction) and the control signal S1 of H level (i.e. flow passage switching instruction) are generated in synchronization with the start of engine. In some embodiments, the engine starts to operate in synchronization with the start of energizing of the ceramic cylinder tube 10 (the control signal S2 of H level). For example, after a predetermined time period has been passed from a time of start of energizing of the ceramic cylinder tube 10, the engine starts to operate. It should be noted that an embodiment is envisaged in which energizing of the ceramic cylinder tube 10 starts after the start of engine.

In some embodiments, the heater 92 is provided adjacent to and downstream of the radially-expanded portion 91a of the flow passage 91 (See FIG. 1). Accordingly, when the valve member 96 is open, the exhaust gas is restricted from flowing into the cells OP10 of the ceramic cylinder tube 10. Note that, an embodiment is envisaged in which energizing of the ceramic cylinder tube 10 continues even after the valve member 96 is switched to the opening state.

In the present embodiment, as shown in FIG. 3, linear portions 13 are radially arranged in the ceramic cylinder tube 10, each linear portion 13 linearly extending in the radial direction of the ceramic cylinder tube 10 so as to include a plurality of first cell-walls 11 that are arranged on the same axial line RL that extends in the radial direction of the ceramic cylinder tube 10. Furthermore, the inner electrode 20 and the outer electrode 30 are provided such that current flows radially at least via the linear portions 13 between the inner electrode 20 and the outer electrode 30. The linear portion 13 supplies a current path linearly extending between the inner electrode 20 and the outer electrode 30, facilitating that current flows in a minimum distance between the inner electrode 20 and the outer electrode 30. The inner electrode 20 and the outer electrode 30 allows formation of radial current paths in the ceramic cylinder tube 10. Accordingly, it would be possible to facilitate that the ceramic cylinder tube 10 increases its temperature up to the target temperature in short period of time while suppressing that greater temperature gradient is caused at the start of energizing.

The linear portion 13 includes a plurality of first cell-walls 11 arranged on the same axial line RL extending in the radial direction of the ceramic cylinder tube 10. It could be understood that the linear portion 13 includes a continuation of first cell-walls 11 on the same axial line RL. The width W13 of the linear portion 13 is constant in the radial direction of the ceramic cylinder tube 10. Alternatively, the width W13 of the linear portion 13 changes from radially inward side to radially outward side of the ceramic cylinder tube 10. The constant width W13 of the linear portion 13 along the radial direction of the ceramic cylinder tube 10 theoretically indicates that an amount of heat generated when current flows through that linear portion 13 is constant along the radial direction of the ceramic cylinder tube 10, suppressing that greater temperature gradient is caused along the radial direction of the ceramic cylinder tube 10. In some embodiments, the width W13 of the linear portion 13 is within a range of 0.05 to 0.5 mm or within a range of 0.05 to 0.2 mm. It should be noted that, the upper limit of the width W13 of the linear portion 13 may be restricted from a view point of suppression of back-pressure or manufacturing or other reasons.

Based on the radial arrangement of the linear portions 13 in the ceramic cylinder tube 10, the radial current paths in the ceramic cylinder tube 10 is generated. The radial current paths is formed between the inner electrode 20 and the outer electrode 30. Specifically, current radially flows from the inner electrode 20 to the outer electrode 30 or current radially flows from the outer electrode 30 to the inner electrode 20.

In some embodiments, the linear portions 13 are provided at a predetermined angular interval in an entire angular range of 360°. Additionally or alternatively, the linear portions 13 are provided axially symmetrically in the ceramic cylinder tube 10. The predetermined angular interval may be within 1° to 5° or within 1° to 3° or within 1° to 2°. For example, in an instance where 200 linear portions 13 are provided, the linear portions 13 are provided at an angular interval of (360°/200)=1.8°. The number of current paths is identical to the number of linear portions 13. Therefore, when such ceramic cylinder tube 10 is energized, 200 current paths are generated at 1.8° interval.

The inner electrode 20 and the outer electrode 30 can take various shapes in so far as generation of radial current path can be facilitated. However, a tube-like electrode can be employed as the inner electrode 20 and/or the outer electrode 30 in order to enhance fixing strength of electrode against the ceramic cylinder tube 10 or to suppress failure in electrical connection between the ceramic cylinder tube 10 and the electrode. That is, in some embodiments, the inner electrode 20 and/or the outer electrode 30 may be a tube-like electrode.

When a tube-like electrode is used as the outer electrode 30, the electrode layer of the outer electrode 30 extends in the circumferential direction of the ceramic cylinder tube 10 to surround the ceramic cylinder tube 10. The electrode layer of the outer electrode 30 is provided radially outward relative to the outer wall portion 15 of the ceramic cylinder tube 10. The outer electrode 30 may be fitted with the outer wall portion 15 of the ceramic cylinder tube 10. When a tube-like electrode is used as the inner electrode 20, the electrode layer of the inner electrode 20 extends in the circumferential direction of the ceramic cylinder tube 10 and is surrounded by the ceramic cylinder tube 10. The electrode layer of the inner electrode 20 is provided radially inward relative to the inner wall portion 14 of the ceramic cylinder tube 10. The inner electrode 20 may be fitted with the inner wall portion 14 of the ceramic cylinder tube 10.

The tube-like electrode may be formed across an entire region of an inner surface 16 of the inner wall 14 of the ceramic cylinder tube 10 or is formed across an entire region of an outer surface 17 of the outer wall 15 of the ceramic cylinder tube 10, not necessarily limited to through. Resistance of the tube-like electrode itself may be decreased, and good electrical connection between the tube-like electrode and the ceramic cylinder tube 10 would be facilitated.

FIG. 5 is a schematic view illustrating an embodiment in which an intermediate layer 39 is interposed between the outer electrode 30 and the ceramic cylinder tube 10 and curved surfaces 80 are formed at corners of cells OP10. An embodiment is envisioned in which an intermediate layer 39 is interposed between the inner electrode 20 and the ceramic cylinder tube 10 and/or an intermediate layer 39 is interposed between the outer electrode 30 and the ceramic cylinder tube 10. The intermediate layer 39 may be made of conductive material, and facilitates better electrical connection or mechanical connection between the ceramic cylinder tube 10 and the electrode. For example, the intermediate layer 39 may include one or more material selected from a group consisting of iron (Fe), chromium (Cr), nickel (Ni), copper (Cu), aluminum (Al), molybdenum (Mo), and carbon (C). The intermediate layer 39 may be conductive slurry, conductive powder, or conductive paste in some embodiments, and may be coated onto the inner circumference surface or outer circumferential surface of the ceramic cylinder tube 10. The intermediate layer 39 may become a hard layer after being heat-processed (or fired) if so required. The thickness of the intermediate layer 39 may be within a range between 0.05 to 2 mm.

Curved surface 80 is formed at least one or each corner of the cell OP10. In other words, the cell OP10 is shaped such that the curved surface 80 is formed at the corner of the cell OP10. Accordingly, stress concentration at the corner of the cell OP10 is avoided, and mechanical strength of the ceramic cylinder tube 10 is enhanced.

FIG. 6 is a schematic view illustrating an embodiment in which grooves 38 extending along the axial direction of the ceramic cylinder tube 10 are formed at the inner circumferential surface of the outer electrode 30. FIG. 7 is a schematic view illustrating an embodiment in which grooves 38 extending along the axial direction of the ceramic cylinder tube 10 are formed at the outer circumferential surface of the outer electrode 30. In both instances of FIGS. 6 and 7, a tube-like electrode is used as the outer electrode 30. As such, in some embodiments, the tube-like electrode used as the inner electrode 20 or the outer electrode 30 is provided with grooves 38 which are arranged in the circumferential direction, facilitating the tube-like electrode to be fitted with the ceramic cylinder tube 10.

In an instance where the outer electrode 30 of the tube-like electrode is fitted with the ceramic cylinder tube 10, a pressure may be applied from the outer electrode 30 to the ceramic cylinder tube 10. Accordingly, more sufficient fixing of the outer electrode 30 to the ceramic cylinder tube 10 would be facilitated, and better electrical connection or mechanical connection between the ceramic cylinder tube 10 and the outer electrode 30 would be facilitated. This holds true for an instance where the intermediate layer 39 is interposed between the ceramic cylinder tube 10 and the outer electrode 30. The above-described pressure may be obtained by shrink-fitting of the outer electrode 30 to the ceramic cylinder tube 10. The outer electrode 30 may be heated so that its opening diameter is increased, and the ceramic cylinder tube 10 is inserted or pressed into the outer electrode 30. Along with cooling of the outer electrode 30, the opening diameter of the outer electrode 30 would be smaller, thereby causing the pressure application from the outer electrode 30 to the ceramic cylinder tube 10.

In an instance in which the inner electrode 20 of the tube-like electrode is fitted with the ceramic cylinder tube 10, a pressure may be applied from the inner electrode 20 to the ceramic cylinder tube 10. Accordingly, more sufficient fixing of the inner electrode 20 to the ceramic cylinder tube 10 would be facilitated, and better electrical connection or mechanical connection between the ceramic cylinder tube 10 and the inner electrode 20 would be facilitated. This holds true for an instance where the intermediate layer 39 is interposed between the ceramic cylinder tube 10 and the inner electrode 20. The above-described pressure may be obtained by cool-fitting or press-fitting of the inner electrode 20 to the ceramic cylinder tube 10. The inner electrode 20 may be cooled so that its outer diameter is reduced, and the inner electrode 20 can be inserted or pressed into the tube hole H10 of the ceramic cylinder tube 10. Along with increase in temperature of the inner electrode 20, the outer diameter of the inner electrode 20 is increased, thereby causing the pressure application from the inner electrode 20 to the ceramic cylinder tube 10.

With respect to the relationship between the inner diameter R1 and the outer diameter R2 of the ceramic cylinder tube 10, $0.3<(R1/R2)$ may be satisfied, or more preferably $0.6<(R1/R2)$ may be satisfied. Smaller the inner diameter would be, greater a change of (amount of generated heat/thermal capacity ratio) in the radial direction, resulting in greater temperature difference. Satisfying $0.3<(R1/R2)$ or $0.6<(R1/R2)$ would allow suppression of increase of back-pressure. In some embodiments, $0.3<(R1/R2)<0.9$ is satisfied, and more preferably $0.6<(R1/R2)<0.8$ is satisfied.

FIG. 8 is a schematic view illustrating an embodiment in which width W12 of second cell-wall is gradually decreased from radially inward side to radially outward side of the ceramic cylinder tube. Similar to above, the radial arrangement of linear portions 13 allows current to flow radially between the inner electrode 20 and the outer electrode 30. The width W12 of the second cell-wall is gradually decreased from radially inward side to radially outward side of the ceramic cylinder tube 10. In other words, with respect to second cell-walls 12 that are adjacent in the radial direction of the ceramic cylinder tube 10, the width W12 of the radially outward second cell-wall of the ceramic cylinder tube 10 is less than the width W12 of the radially inward second cell-wall of the ceramic cylinder tube 10. This enables that the thermal capacitance would be lesser as shifting radially outward of the ceramic cylinder tube 10. The width W12 of the second cell-wall would be set so as to reduce the extent of thermal gradient in the radial direction of the ceramic cylinder tube 10.

In some embodiments that are different from FIG. 8, the width W12 of the second cell-wall would be gradually increased from radially inward side to radially outward side of the ceramic cylinder tube 10. In other words, with respect to the second cell-walls 12 that are adjacent in the radial direction of the ceramic cylinder tube 10, the width W12 of the radially outward second cell-wall of the ceramic cylinder tube 10 is greater than the width W12 of the radially inward second cell-wall of the ceramic cylinder tube 10. This enables that the thermal capacitance would be lesser as shifting radially inward of the ceramic cylinder tube 10. The width W12 of the second cell-wall would be set so as to reduce the extent of thermal gradient in the radial direction of the ceramic cylinder tube 10.

An embodiment is envisaged in which the second cell-wall 12 positioned radially outward of the ceramic cylinder tube 10 extends longer along the circumferential direction of the ceramic cylinder tube 10 than the second cell-wall 12 positioned radially inward of the ceramic cylinder tube 10. If the width W12 of the radially inward second cell-wall of the ceramic cylinder tube 10 and the width W12 of the second cell-wall 12 positioned radially outward of the ceramic cylinder tube 10 are the same, the thermal capacitance that is in accordance with the second cell-wall 12 connecting the linear portions 13 would be greater at radially outward positions than the radially inward positions of the ceramic cylinder tube 10. In a case where the width W12 of the second cell-wall is gradually decreased from radially inward side to radially outward side of the ceramic cylinder tube 10, the values of thermal capacitances that are in accordance with the second cell-walls 12 connecting the linear portions 13 at respective radially inward and radially outward positions of the ceramic cylinder tube 10 would be closer. The width W12 of the second cell-wall would vary in various manner but in some embodiments, the width W12 of the second cell-wall may vary at constant rate in the radial direction of the ceramic cylinder tube 10.

FIG. 9 is a schematic view illustrating an embodiment in which opening shapes of cells OP10 are distorted rectangle. As illustrated in FIG. 9, an embodiment is envisioned in which the second cell-wall 12 extends in an arc or in a curve along the circumferential direction. Similar to above, the radial arrange of the linear portions 13 allows current to flow radially between the inner electrode 20 and the outer electrode 30.

FIG. 10 is a schematic view illustrating an embodiment in which cell-columns of M (M-natural number equal to or greater than 2) cells and cell-columns of N (N-natural number equal to or greater than 2, N being less than M) cells are alternately arranged in the circumferential direction. In the illustrated instance of FIG. 10, M=3 and N=4. Similar to above, the radial arrange of the linear portions 13 allows current to flow radially between the inner electrode 20 and the outer electrode 30.

FIG. 11 is a schematic view illustrating an embodiment in which the width W13 of linear portion 13 is gradually increased from radially inward side to radially outward side of the ceramic cylinder tube 10.

The following formula is known as a Joule's law.

$$Q=(V^2/R)t=(I^2R)t$$

Here, Q represents an amount of heat (J), V represents a voltage (V), R represents a resistance (Ω), and t represents time (second).

Current flowing in one linear portion 13 is constant, and therefore an amount of heat would be greater as the resistance (R) of linear portion 13 increases. Decreased width of the linear portion 13 results in increase of resistance of linear portion 13, thus increasing the amount of heat to be generated.

An embodiment is envisaged in which the width W13 of the linear portion 13 varies along the radial direction of the ceramic cylinder tube 10. In an illustrated embodiment of FIG. 11, the width W13 of linear portion 13 is gradually increased from radially inward side to radially outward side of the ceramic cylinder tube 10. In an illustrated embodiment of FIG. 12, the width W13 of the linear portion 13 is gradually decreased from radially inward side to radially outward side of the ceramic cylinder tube 10. The change in width of the linear portion 13 in the radial direction of the ceramic cylinder tube 10 indicates the change of thermal capacitance in the radial direction of the ceramic cylinder tube 10. In an illustrated embodiment of FIG. 12, an amount of generated heat at radially outward position of the ceramic cylinder tube 10 would be greater than an amount of heat generated at radially inward position of the ceramic cylinder tube 10. The thermal capacitance of second cell-walls 12 which do not contribute to generate heat would be greater as shifting radially outward, and thus temperature gradient in the radial direction of the ceramic cylinder tube 10 would be mitigated.

An embodiment is envisaged in which the width of the linear portion 13 would be gradually increased from radially outward side to inward side of the ceramic cylinder tube 10. It would be possible, by appropriately designing the flow passage 91, to facilitate that exhaust gas is guided to flow into cells having smaller opening size.

Working Example

An inner electrode and an outer electrode were fixed to a ceramic cylinder tube of an outer diameter of 70 mm, inner diameter of 50 mm, and axial length of 46 mm. The ceramic cylinder tube was made of porous Si-coupled SiC. Each of the inner electrode and the outer electrode was a tube-like electrode and was made of stainless steel. Arrangement of cells in the ceramic cylinder tube was as illustrated in FIG. 3, and linear portions were radially arranged. Simulation was performed using software. As a condition of simulation, voltage 45V was applied for one second to the ceramic cylinder tube between the inner electrode and the outer electrode.

Comparative Example 1

An inner electrode and an outer electrode were fixed to a ceramic cylinder tube of an outer diameter of 70 mm, inner diameter of 50 mm, and axial length of 46 mm. The ceramic cylinder tube was made of porous Si-coupled SiC. Each of the inner electrode and the outer electrode was a tube-like electrode and was made of stainless steel. Arrangement of cells in the ceramic cylinder tube was as illustrated in FIG. 14. Simulation was performed using software. As a condition of simulation, voltage 45V was applied for one second to the ceramic cylinder tube between the inner electrode and the outer electrode.

Comparative Example 2

As shown in FIG. 15, a first outer circumferential electrode 101 and a second outer circumferential electrode 102 were fixed to a ceramic cylinder body 100 of an outer diameter of 100 mm and axial length of 46 mm. The first outer circumferential electrode 101 and the second outer circumferential electrode 102 were positioned to sandwich the ceramic cylinder body 100. The ceramic cylinder body 100 was made of porous Si-coupled SiC. Each electrode was made of stainless steel. Arrangement of cells in the ceramic cylinder body was as illustrated in FIG. 15. Simulation was performed using software. As a condition of simulation, voltage 45V was applied for one second to the ceramic cylinder body between the electrodes.

Differences of maximum temperature and minimum temperature caused in the ceramic cylinder tube or body were determined for the respective ones of the working example and comparative examples. The result is schematically shown by FIG. 13, and more specifically shown in Chart 1.

CHART 1

| | Arrangement of cells | Arrangement of electrodes | Temperature gradient |
| --- | --- | --- | --- |
| Working example | FIG. 3 | FIG. 2 | 35° C. |
| Comparative example 1 | FIG. 14 | FIG. 2 | 144° C. |
| Comparative example 2 | FIG. 15 | FIG. 15 | 775° C. |

In the comparative example 2, in accordance with the start of energizing, current path was formed in a portion of the ceramic cylinder body 100 between the first outer circumferential electrode 101 and the second outer circumferential electrode 102. Joule heat was generated in this current path, and heat transmission was caused to the cells or cell-walls thermally coupled to the current path. In an instance in which the ceramic cylinder body 100 is heated up to a target temperature within a short period of time, Joule heat is dominant over thermal transmission, and thus great temperature gradient was caused in cross-section of the ceramic cylinder body 100 (See Chart 1).

Given the above disclosure, a skilled person in the art would be able to add various modifications to the respective embodiments.

What is claimed is:

1. A heater comprising:
a conductive ceramic cylinder tube provided with a plurality of cells, each cell being defined by a pair of first cell-walls and a pair of second cell-walls, each of the pair of first cell-walls extending in a different radial direction of the ceramic cylinder tube, and each of the pair of second cell-walls extending so as to cross the radial direction of the ceramic cylinder tube;
an inner electrode electrically coupled to an inner wall of the ceramic cylinder tube; and
an outer electrode electrically coupled to an outer wall of the ceramic cylinder tube, wherein
linear portions are radially arranged in the ceramic cylinder tube, each linear portion linearly extending in the radial direction of the ceramic cylinder tube so as to include a plurality of first cell-walls that are arranged on the same axial line that extends in the radial direction of the ceramic cylinder tube, wherein the width of the linear portion gradually decreases outwardly along the radial direction of the ceramic cylinder tube, and
the inner and outer electrodes are provided such that current flows radially at least via said linear portions between the inner and outer electrodes.

2. The heater of claim 1, wherein the linear portions are arranged at a predetermined angular interval in an entire angular range of 360°.

3. The heater of claim 2, wherein the predetermined angular interval is within 1° to 5°.

4. The heater of claim 1, wherein the inner electrode and/or the outer electrode is a tube-like electrode.

5. The heater of claim 4, wherein the tube-like electrode is formed across an entire region of an inner surface of the inner wall of the ceramic cylinder tube or is formed across an entire region of an outer surface of the outer wall of the ceramic cylinder tube.

6. The heater of claim 4, wherein the tube-like electrode is provided with grooves that are arranged along a circumferential direction of the tube-like electrode.

7. The heater of claim 1, wherein 0.3<(R1/R2) is satisfied, where R1 represents an inner diameter of the ceramic cylinder tube, and R2 represents an outer diameter of the ceramic cylinder tube.

8. The heater of claim 1, wherein 0.6<(R1/R2) is satisfied, where R1 represents an inner diameter of the ceramic cylinder tube, and R2 represents an outer diameter of the ceramic cylinder tube.

9. The heater of claim 1, wherein respective thicknesses of the first and second cell-walls are within a range of 0.05 to 0.5 mm.

10. The heater of claim 1, wherein a thickness of the second cell-wall is gradually reduced from radially inward side to radially outward side of the ceramic cylinder tube.

11. The heater of claim 1, wherein with respect to the second cell-walls which are adjacent in the radial direction of the ceramic cylinder tube, a width of the radially outward second cell-wall of the ceramic cylinder tube is different from a width of the radially inward second cell-wall of the ceramic cylinder tube.

12. The heater of claim 1, wherein a rounded surface is formed at least one or each corner of the cell.

13. The heater of claim 1, wherein the number of the linear portions is equal to the number of radial directions on which the first cell-walls are arranged.

14. The heater of claim 1, wherein the respective linear portions extend between and are coupled between the inner and outer walls.

15. A system comprising:
a flow passage in which an exhaust gas flows;
a heater of claim 1;
an exhaust gas purification device provided downstream of the heater in a flow direction of the exhaust gas in the flow passage; and
a switching unit that switches between first and second flow channels, the first flow channel being provided by the cells of the ceramic cylinder tube included in the heater, and the second flow channel being provided by a tube hole that is surrounded by the cells of the ceramic cylinder tube.

16. A method of manufacturing a heater, comprising:
producing, based on extrusion molding, a conductive ceramic cylinder tube provided with a plurality of cells, each cell being defined by a pair of first cell-walls and a pair of second cell-walls, each of the first cell-walls extending in a different radial direction of the ceramic cylinder tube, and each of the second cell-walls extending so as to cross the radial direction of the ceramic cylinder tube;
fixing an inner electrode to the ceramic cylinder tube; and
fixing an outer electrode to the ceramic cylinder tube, wherein
linear portions are radially arranged in the ceramic cylinder tube, each linear portion linearly extending in the radial direction of the ceramic cylinder tube so as to include a plurality of first cell-walls that are arranged on the same axial line that extends in the radial direction of the ceramic cylinder tube, wherein the width of the linear portion gradually decreases outwardly along the radial direction of the ceramic cylinder tube, and
the inner and outer electrodes are provided such that current flows radially at least via said linear portions between the inner and outer electrodes.

17. The method of claim 16, wherein said fixing an inner electrode to the ceramic cylinder tube comprises cooling or pressing the inner electrode to be fitted into the ceramic cylinder tube.

18. The method of claim 16, wherein said fixing an outer electrode to the ceramic cylinder tube comprises heating the outer electrode to be fitted to the ceramic cylinder tube.

19. The method of claim 16, wherein an intermediate layer is interposed between the ceramic cylinder tube and the inner electrode.

20. The method of claim 16, wherein an intermediate layer is interposed between the ceramic cylinder tube and the outer electrode.

* * * * *